(12) United States Patent
Kuravangi-Thammaiah et al.

(10) Patent No.: US 12,549,938 B2
(45) Date of Patent: Feb. 10, 2026

(54) SYSTEMS AND METHODS FOR SESSION SETUP IN A CORE NETWORK

(71) Applicant: Verizon Patent and Licensing Inc., Basking Ridge, NJ (US)

(72) Inventors: Shanthala Kuravangi-Thammaiah, Keller, TX (US); Lalit R. Kotecha, San Ramon, CA (US); Violeta Cakulev, Milburn, NJ (US); Hossein M. Ahmadi, Parsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 483 days.

(21) Appl. No.: 18/064,554

(22) Filed: Dec. 12, 2022

(65) Prior Publication Data

US 2024/0196193 A1 Jun. 13, 2024

(51) Int. Cl.
*H04W 8/20* (2009.01)
(52) U.S. Cl.
CPC ..................... *H04W 8/20* (2013.01)

(58) Field of Classification Search
CPC .......................................................... H04W 8/20
USPC ...................................................... 455/422.1
See application file for complete search history.

(56) References Cited

U.S. PATENT DOCUMENTS

2022/0322053 A1* 10/2022 Das ..................... H04L 41/0893

* cited by examiner

*Primary Examiner* — Joel Ajayi

(57) ABSTRACT

In some implementations, a first network function device included in a core network may receive an indication of a user data management (UDM) group identifier that is associated with a UDM network function device included in the core network. The first network function device may determine, based on the UDM group identifier, a user data repository (UDR) group identifier associated with a UDR network function device that is associated with the UDM network function device. The first network function device may transmit, to one or more second network function devices included in the core network, an indication of the UDR group identifier.

20 Claims, 14 Drawing Sheets

SYSTEMS AND METHODS FOR SESSION SETUP IN A CORE NETWORK

BACKGROUND

In a fifth generation (5G) core network, a network function device may discover and obtain user data from other network function devices, such as a user data repository (UDR) network function device and/or a unified data management (UDM) network function device in order to establish a session for a user device. The user data may include information such as which services are enabled for the user device, what the subscriptions of the user device are, and/or other user data.

DETAILED DESCRIPTION OF EXAMPLE EMBODIMENTS

Figure 1A:
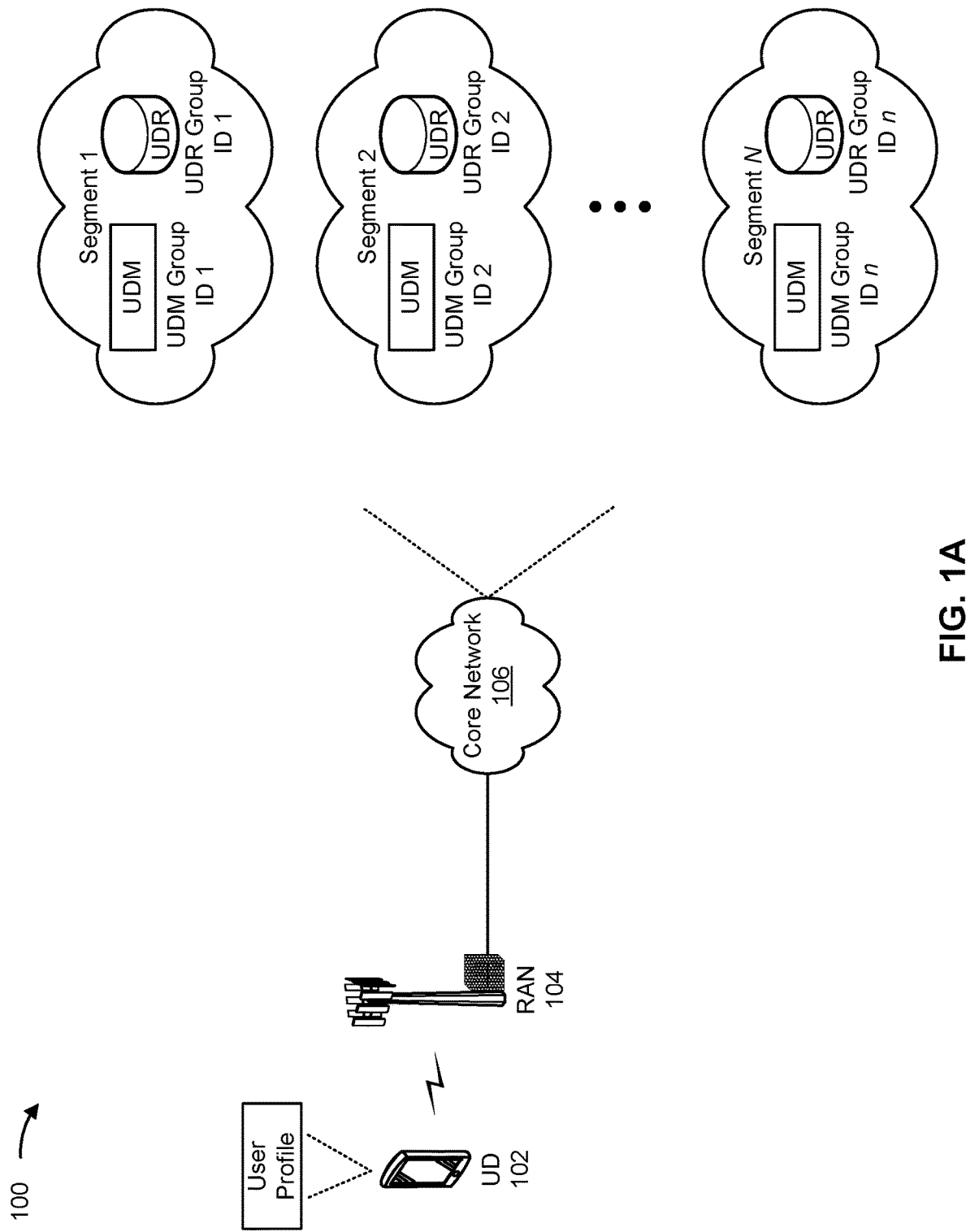
FIGS. 1A-1G are diagrams of an example associated with session setup in a core network.

The following detailed description of example implementations refers to the accompanying drawings. The same reference numbers in different drawings may identify the same or similar elements.

In a session setup procedure for a user device, a network function in a core network (e.g., a fifth generation (5G) core network or another generation of core network) may query a network repository function (NRF) network function device to discover other network functions in the core network. The other network functions may include a user data repository (UDR) network function device and/or a unified data management (UDM) network function device to which the user device is assigned. The core network may include many UDR network function and UDM network function device pairs that each cover a specific geographic area in a wireless network (e.g., a 5G wireless network or another type of wireless network), and each user device may be assigned to only one UDR network function device and one UDM network function device at a time. The NRF network function device performs a lookup to identify the UDR network function device and UDM network function device based on an identifier (e.g., a subscription permanent identifier (SUPI) or another type of identifier) associated with a user profile that is assigned to the user device. This lookup may be referred to as a SUPI-based lookup.

A core network may include many network function devices that query the NRF network function device to discover the UDM network function device and the UDR network function device during a session setup procedure for the user device. Thus, the NRF network function device performs many SUPI-based lookups, for each of the network function devices, to identify the UDR network function device and the UDM network function device to which the user device is assigned. The high quantity of SUPI-based lookups results in greatly increased session setup latency for the user device, which may result in increased session setup times for the user device. As an example, the session setup latency may increase as each additional network function device queries the NRF network function devices (e.g., five additional network function devices querying the NRF network function device during the session setup procedure may result in approximately a 500% increase in latency). Moreover, the increased session setup latency may result in an increased likelihood of a session setup timeout, which may result in a fallback to a legacy core network (e.g., a long-term evolution (LTE) core network) and reduced transfer speeds and reduced quality of service (QOS) for the user device.

Some implementations described herein provide systems and methods for session setup in a core network. In a session setup procedure for a user device, a first network function device in a core network performs a SUPI-based lookup with the NRF network function device to discover the UDM network function device to which the user device is assigned. The NRF network function device provides, to the first network function device, information associated with the UDM network function device to which the user device is assigned. The information may include a UDM group identifier associated with the UDM network function device.

Instead of other network functions in the core network performing similar operations with the NRF network function device to discover the UDM network function device and/or a UDR network function device associated with the UDM network function device, the first network function provides the UDM group identifier to an access and mobility management function (AMF) network function device and/or a session management function (SMF) network function device. The AMF network function device and/or the SMF network function device may determine the UDR group identifier based on an association between the UDR network function device and the UDM network function device. The AMF network function device and/or the SMF network function device may provide an indication of the UDR group identifier to other network function devices in the core network. In this way, the other network functions do not repeat the SUPI-based lookup with the NRF network function device, and instead can proceed directly with requesting user data, associated with the user device, from the UDR network function device and/or the UDM network function device using the appropriate identifier provided by the first network function.

In this way, the quantity of SUPI-based lookups with the NRF network function device during the session setup procedure for the user device is reduced, which greatly reduces latency in the session setup procedure, reduces the overhead signaling load on the core network, and/or reduces the transactions per section (TPS) in the core network (which reduces consumption of processing, memory, and/or networking resources for network function devices in the core network). In particular, the amount of latency reduction is directly dependent upon the quantity of network function devices that would otherwise repeat the SUPI-based lookup that is performed by the first network function device. For example, if only one network function device performs a SUPI-based lookup instead of six network function devices, the latency reduction based on the techniques described herein may be approximately 83%. Accordingly, the session setup procedures described herein may reduce session setup times for a user device, and may reduce the likelihood of a session setup timeout occurring, which might otherwise result in a fallback to an LTE core network.

FIGS. 1A-1E are diagrams of an example 100 associated with session setup in a core network. As shown in FIGS. 1A, example 100 includes a user device (UD) 102, a radio access network (RAN) 104, and a core network 106 (e.g., a 5G core network).

As shown in FIG. 1A, the user device 102 may communicate with the core network 106 via the RAN 104. For example, the user device 102 and the RAN 104 may communicate by exchanging wireless communications on a wireless communication link. The wireless communication link may include a downlink (e.g., a link from the RAN 104 to the user device 102) and an uplink (e.g., a link from the user device 102 to the RAN 104). The RAN 104 and the core network 106 may communicate on wired and/or wireless communication links.

The user device 102 may be associated with a user profile. The user profile may be associated with a subscriber (e.g., a user) of a wireless network that includes the RAN 104 and the core network 106. The user profile may include information associated with the subscriber. For example, the user profile may include a SUPI (or another type of identifier such as an international mobile subscriber identity (IMSI)) associated with the subscriber. As another example, the user profile may include an indication of the wireless network carrier to which the user subscriber is subscribed. As another example, the user profile may include a mobile equipment identifier (MEID) of the user device 102 associated with the subscriber. The user profile may be stored in a subscriber identity module (SIM) card that is inserted into the user device 102, may be stored in an electronic SIM (eSIM) device on the user device 102, may be stored in a universal SIM (USIM) on a universal integrated circuit card (UICC) in the user device 102, and/or may be stored elsewhere on the user device 102.

The SUPI is a globally unique identifier that is allocated to each subscriber. The SUPI may include a string (e.g., a 15-digit string) of alphanumeric characters. The string may include a subset of digits indicating a mobile network code (MNC) associated with the wireless network carrier, a subset of digits indicating a mobile country code (MCC), and/or a subset of digits indicating a mobile subscriber identification number (MSIN) associated with the subscriber, among other examples.

As further shown in FIG. 1A, the core network 106 may be logically and/or physically arranged into a plurality of network slices or segments (e.g., Segment 1 through Segment N). Each segment may be associated with a UDM network function device and UDR network function device pair. Each segment (and thus, each UDM network function device and UDR network function device pair) may be associated with, and may be configured to serve, a particular geographic area. For example, Segment 1 may be associated with, and may be configured to serve, a western portion of the United States; Segment 2 may be associated with, and may be configured to serve, a central portion of the United States; Segment N may be associated with, and may be configured to serve, an eastern portion of the United States; and so on.

User devices 102 that are located in a particular geographic area to which a UDM network function device and UDR network function device pair is assigned may be assigned to the UDM network function device and UDR network function device pair in a subscription profile associated with the user devices 102. An identifier (e.g., a SUPI or another type of identifier) assigned to a user device 102 may be associated with (and only with) the UDM network function device and UDR network function device pair assigned to the particular geographic area in which the user device 102 is located.

As further shown in FIG. 1A, each UDM network function device may be associated with a respective and unique UDM group identifier. The UDM group identifier associated with a UDM network function device may identify the UDM network function device from other UDM network function devices in the core network 106. For example, the UDM network function device in Segment 1 may be associated with a first UDM group identifier (ID 1), the UDM network function device in Segment 2 may be associated with a second UDM group identifier (ID 2), the UDM network function device in Segment N may be associated with a first UDM group identifier (ID n), and so on. A UDM group identifier may include one or more components, such as a UDM identifier number, a network slice identifier, and/or another component.

Similarly, each UDR network function device may be associated with a respective and unique UDR group identifier. The UDR group identifier associated with a UDR network function device may identify the UDR network function device from other UDR network function devices in the core network 106. For example, the UDR network function device in Segment 1 may be associated with a first UDR group identifier (ID 1), the UDR network function device in Segment 2 may be associated with a second UDM group identifier (ID 2), the UDR network function device in Segment N may be associated with a first UDR group identifier (ID n), and so on. A UDR group identifier may include one or more components, such as a UDR identifier number, a network slice identifier, and/or another component.

Figure 1B:
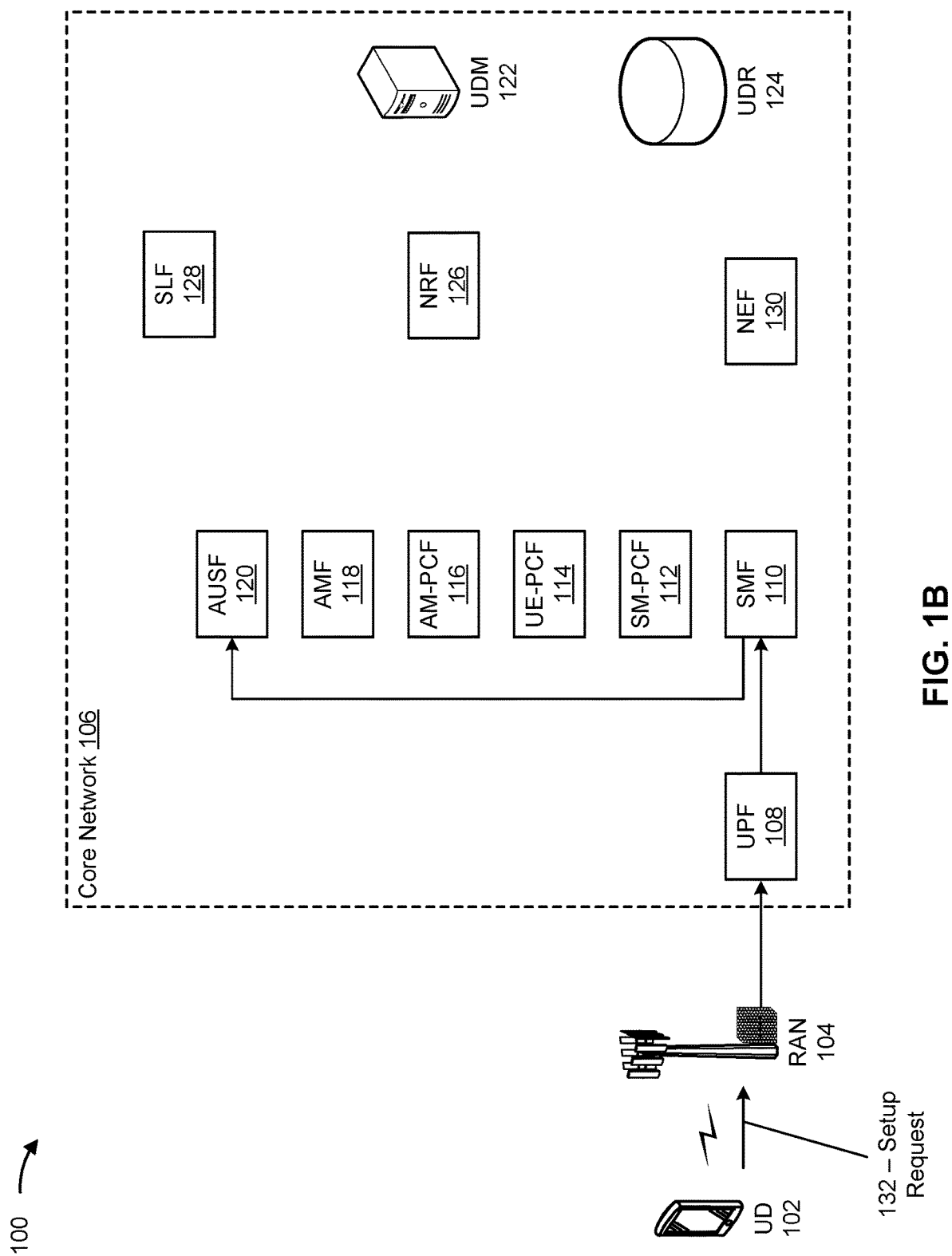

As shown in FIG. 1B, the core network 106 may include a plurality of network function devices. For example, the core network 106 may include a user plane function (UPF) network function device (referred to as the UPF 108). As another example, the core network 106 may include a session management function (SMF) network function device (referred to as the SMF 110). As another example, the core network 106 may include a session management policy control function (SM-PCF) network function device (referred to as the SM-PCF 112). As another example, the core network 106 may include a user equipment policy control function (UE-PCF) network function device (referred to as the UE-PCF 114). As another example, the core network 106 may include an access and mobility management policy control function (AM-PCF) network function device (referred to as the AM-PCF 116). As another example, the core network 106 may include an access and mobility management function (AMF) network function device (referred to as the AMF 118).

As another example, the core network 106 may include an authentication server function (AUSF) network function device (referred to as the AUSF 120). As another example, the core network 106 may include a UDM network function device (referred to as the UDM 122). As another example, the core network 106 may include a unified data repository (UDR) network function device (referred to as the UDR 124). As another example, the core network 106 may include a network resource function (NRF) network function device (referred to as the NRF 126). As another example, the core network 106 may include a subscriber locator function (SLF) network function device (referred to as the SLF 128). As another example, the core network 106 may include a network exposure function (NEF) network function device (referred to as the NEF 130).

In some implementations, the core network 106 includes additional network function devices, fewer network function devices, and/or a different combination of network function devices. Further details of the user device 102, the RAN 104, the core network 106, the UPF 108, the SMF 110, the SM-PCF 112, the UE-PCF 114, the AM-PCF 116, the AMF 118, the AUSF 120, the UDM 122, the UDR 124, the NRF 126, the SLF 128, and the NEF 130 are provided elsewhere herein, such as in connection with FIG. 3.

The network function devices may communicate via various 5G network function interfaces. For example, network function devices may communicate with the SMF 110 via an Nsmf 5G network function interface. As another example, network function devices may communicate with the SM-PCF 112 via an Npcf 5G network function interface. As another example, network function devices may communicate with the UE-PCF 114 via an Npcf 5G network function interface. As another example, network function devices may communicate with the AM-PCF 116 via an Npcf 5G network function interface. As another example, network function devices may communicate with the AMF 118 via an Namf 5G network function interface. As another example, network function devices may communicate with the AUSF 120 via an Nausf 5G network function interface. As another example, network function devices may communicate with the NEF 130 via an Nnef 5G network function interface. These interfaces enable propagation of information, provided from the NRF 126, directly between the other network interfaces, which reduces the quantity of lookups that the NRF 126 is to perform during a session setup procedure.

As shown in FIG. 1B, the operations described in connection with the example 100 may be performed in connection with a session setup procedure for the user device 102. At 132, the session setup procedure may be initiated based on reception of a setup request at the AUSF 120 from the user device 102. The user device 102 may transmit the setup request to the AUSF 120 through the RAN 104, the UPF 108, and the SMF 110. In some implementations, the SMF 110 may provide the setup request to the AUSF 120 through the AMF 118. The setup request may include a registration request, a protocol data unit (PDU) session setup request, and/or another type of request.

The setup request may indicate a subscription concealed identifier (SUCI) associated with the user profile that is associated with the user device 102. The SUCI may include an identifier that contains and conceals the SUPI of the user device 102 for enhanced privacy and security. The user device 102 may generate the SUCI based on the SUPI and a public key associated with the home network of the subscriber associated with the user profile.

The SUCI may be provided to the AUSF 120 based on the setup request being the first time that the user device 102 is registering with the core network 106. Accordingly, the setup request may be an initial registration request message. The AUSF 120 may determine, based on the SUCI, the SUPI associated with the user profile that is associated with the user device 102. For example, the AUSF 120 (or another network function device) may perform a decryption operation to decrypt the SUCI and to obtain the SUPI contained in the SUCI.

Figure 1C:
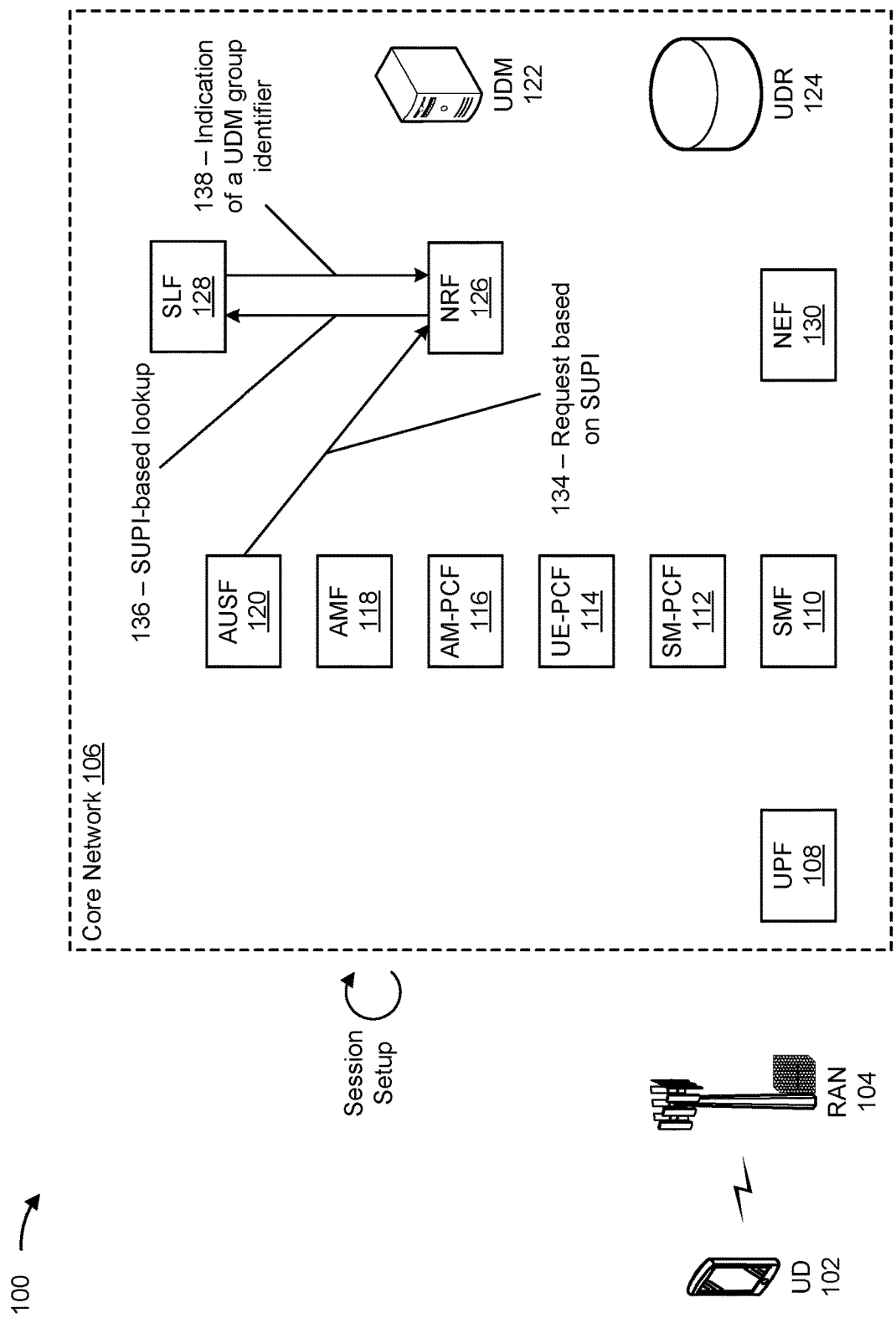

As shown in FIG. 1C, at 134, the AUSF 120 may initiate a SUPI-based lookup for the user device 102. The AUSF 120 may initiate the SUPI-based lookup by transmitting a request to the NRF 126. The request may include a request to discover the UDM 122 associated with the user profile of the user device 102. The request may implicitly or explicitly indicate that the NRF 126 is to provide the AUSF 120 with an indication of a UDM group identifier associated with the UDM 122 that is associated with the user profile of the user device 102. The request may further include an indication of the SUPI associated with the user profile of the user device 102.

The NRF 126 may receive the request from the AUSF 120 and, at 136, may perform the SUPI-based lookup based on receiving the request. In particular, the NRF 126 may query the SLF 128 using the SUPI associated with the user profile of the user device 102 to determine the UDM group identifier associated with the UDM 122 that is associated with the user profile of the user device 102. The NRF 126 may provide an indication of the SUPI to the SLF 128. The SUPI-based lookup may include an indication to provide the UDM group identifier.

At 138, the SLF 128 may respond with an indication of the UDM group identifier associated with the UDM 122 that is associated with the user profile of the user device 102. The SLF 128 may identify the UDM group identifier based on an association, between the SUPI and the UDM group identifier, stored in the SLF 128.

Figure 1D:
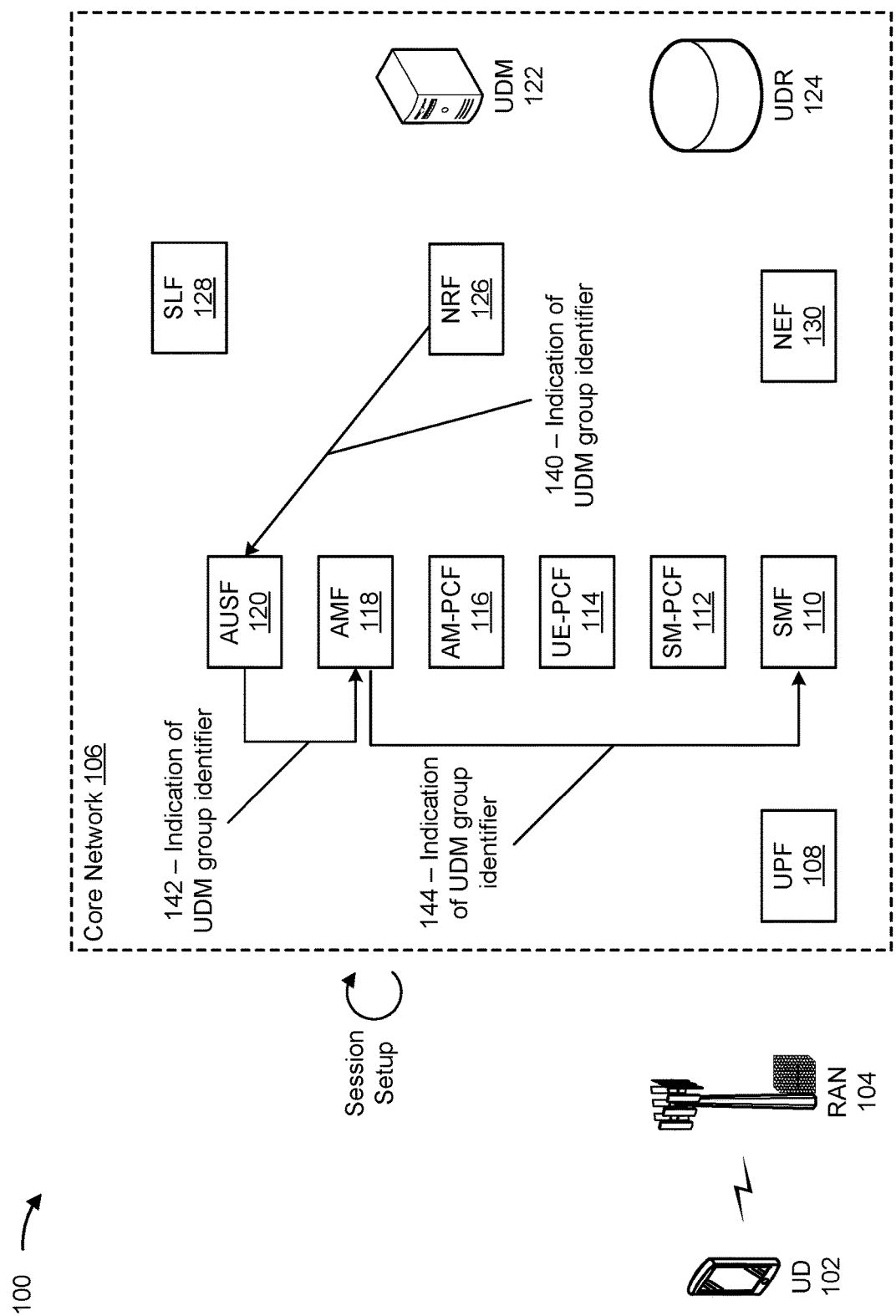

As shown in FIG. 1D, at 140, the NRF 126 may transmit an indication of the UDM group identifier to the AUSF 120. The NRF 126 may transmit the indication of the UDM group identifier to the AUSF 120 based on receiving the request from the AUSF 120. In some implementations, the NRF 126 may provide the indication of the UDM group identifier to the AUSF 120 via the Nausf 5G network function interface.

In some implementations, the NRF 126 transmits additional information to the AUSF 120 based on receiving the request from the AUSF 120. For example, the NRF 126 may transmit a subscriber profile, associated with the user profile that is associated with the user device 102, to the AUSF 120 based on receiving the request. In some implementations, the NRF 126 retrieves the subscriber profile from the UDM 122 (which retrieves the subscriber profile from the UDR 124). In some implementations, the NRF 126 stores the subscriber profile at the NRF 126.

In some implementations, the NRF 126 transmits the indication of the UDM group identifier in the subscriber profile that is transmitted to the AUSF 120. The subscriber profile may include various sections, such as an access management profile, a session management profile, and/or another section. In some implementations, the subscriber profile may include a particular section that is dedicated for indicating the UDM group identifier. As another example, the NRF 126 may transmit a UDM profile, associated with the user profile that is associated with the user device 102, to the AUSF 120 based on receiving the request.

At 142, the AUSF 120 may transmit the indication of the UDM group identifier to the AMF 118. In some implementations, the AUSF 120 may transmit (and the AMF 118 may receive) the indication of the UDM group identifier via the Namf 5G network function interface. In some implementations, the AUSF 120 may transmit the indication of the UDM group identifier to the AMF 118 based on receiving the indication of the UDM group identifier from the NRF 126.

At 144, the AMF 118 may transmit the indication of the UDM group identifier to the SMF 110. For example, the AMF 118 may transmit the indication of the UDM group identifier to the SMF 110 via the Nsmf 5G network function interface. In some implementations, the AMF 118 transmits the indication of the UDM group identifier to the SMF 110 based on receiving the indication of the UDM group identifier from the AUSF 120. In some implementations, the AMF 118 transmits the indication of the UDM group identifier to the SMF 110 based on receiving a request for the UDM group identifier. As an example, the SMF 110 may transmit (e.g., via the Namf 5G network function interface) a network function group identifier request (e.g., 3gpp-SBI-Discovery-Target-NF-GroupId) to the AMF 118. The AMF 118 may receive the request and may respond by transmitting the indication of the UDM group identifier in a network function group identifier response (e.g., 3gpp-SBI-Target-NF-GroupId).

Figure 1E:
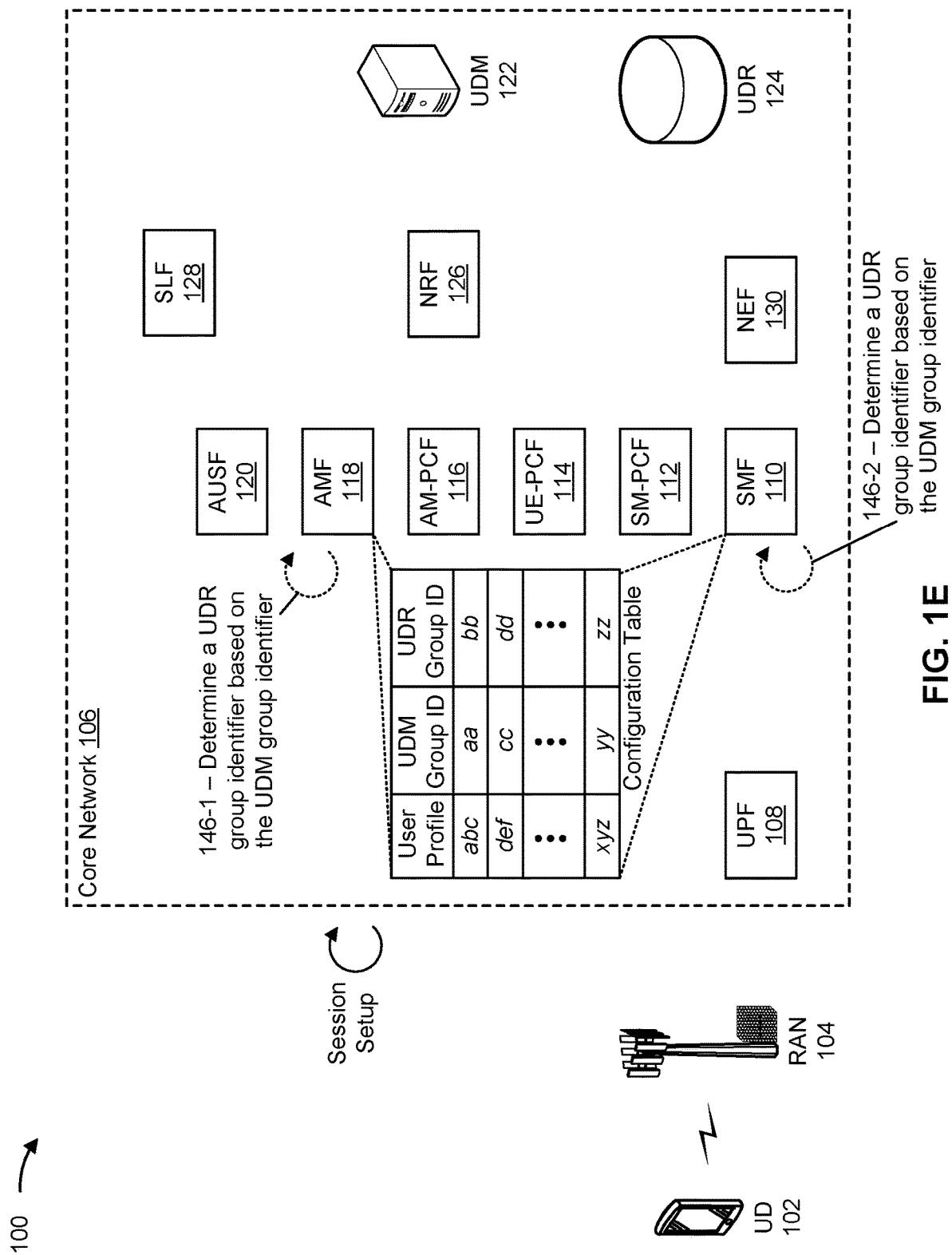

As shown in FIG. 1E, one or more network function devices in the core network 106 may identify or determine a UDR group identifier that is associated with the UDR 124 that is associated with the UDM 122. As an example, at 146-1, the AMF 118 may determine the UDR group identifier based on the UDM group identifier provided by the AUSF 120. As another example, at 146-2, the SMF 110 may determine the UDR group identifier based on the UDM group identifier provided by the AMF 118. The UDR 124 may be associated with the UDM 122 in that the UDR 124 and the UDM 122 may be associated with the same segment or network slice of the core network 106.

The AMF 118 and/or the SMF 110 may determine the UDR group identifier based on an association between the UDR group identifier and the UDM group identifier. For example, the AMF 118 and/or the SMF 110 may each store and maintain a configuration table that includes associations or mappings between UDM network function device and UDR network function device pairs for each of the segments 1 through N in the core network 106. The configuration table may include a one-to-one (1:1) mapping between a UDM group identifier and a UDR group identifier in a particular segment. For example, the configuration table may include a plurality of rows for each user profile that is associated with the core network 106, and each row may indicate an association or mapping between a UDM group identifier and a UDR group identifier. Moreover, each row may be associated with a particular user profile, and may indicate an association between the user profile, a UDM group identifier, and a UDR group identifier.

As an example of the above, a row in the configuration table may indicate a mapping between a user profile abc, a UDM group identifier aa, and a UDR group identifier bb. As another example, another row in the configuration table may indicate a mapping between a user profile def, a UDM group identifier cc, and a UDR group identifier dd. As another example, another row in the configuration table may indicate a mapping between a user profile xyz, a UDM group identifier yy, and a UDR group identifier zz.

The AMF 118 and/or the SMF 110 may perform a lookup in the configuration table based on the UDM group identifier and/or based on the user profile associated with the user device 102. For example, the AMF 118 and/or the SMF 110 may identify a particular row in the configuration table that includes an indication of the UDM group identifier and/or that includes an indication of the user profile associated with the user device 102. The AMF 118 and/or the SMF 110 may determine the UDR group identifier that is indicated in the row.

The AMF 118 and/or the SMF 110 may store the configuration table in a memory device, in a data store, in a data structure, in an electronic file, in a database, in an electronic file system, in an electronic file folder, and/or in another type of data structure.

Figure 1F:
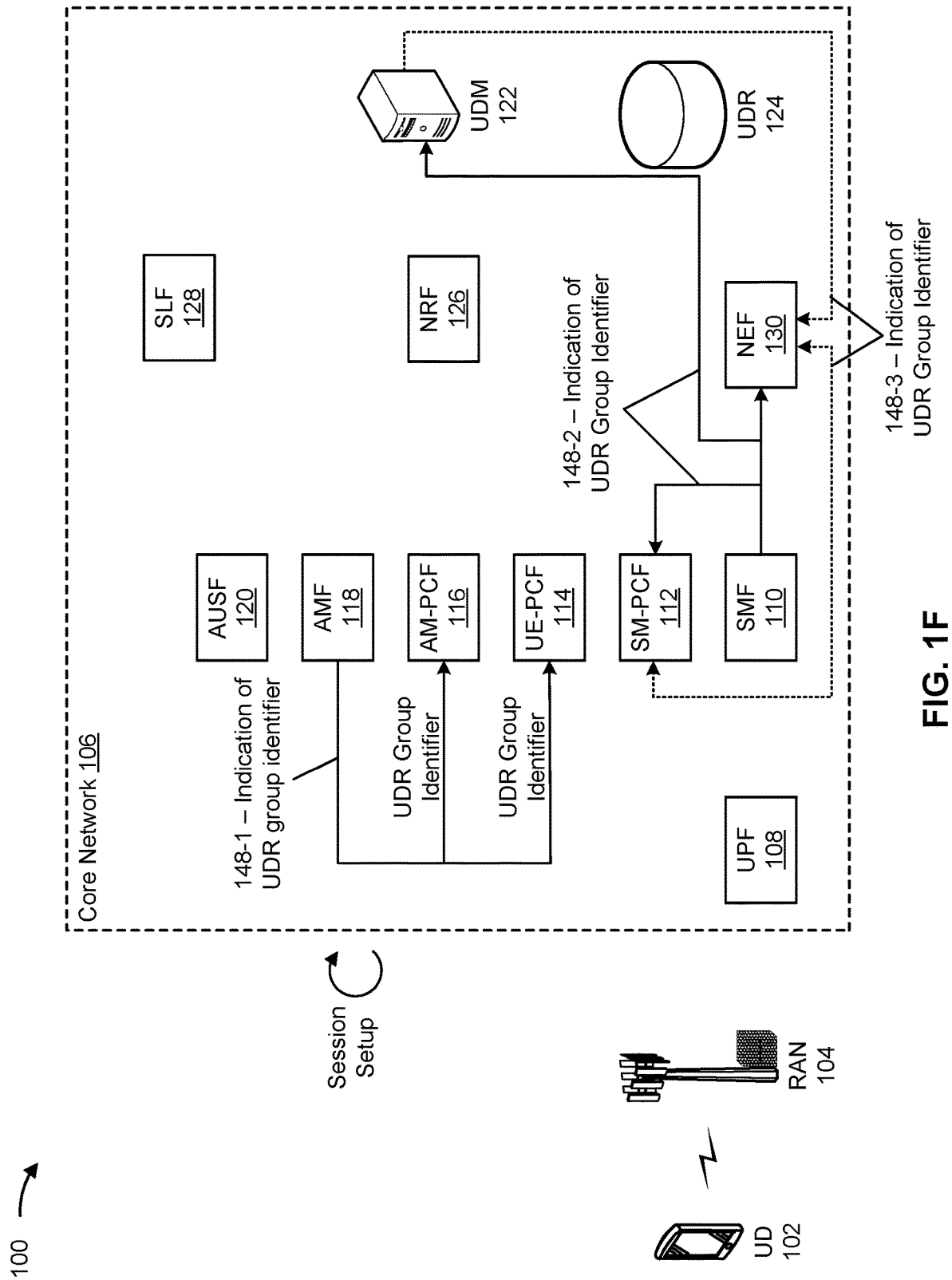

As shown in FIG. 1F, the AMF 118 and/or the SMF 110 may transmit an indication of the UDR group identifier to one or more other network function devices in the core network 106. In some implementations, the AMF 118 and/or the SMF 110 may transmit an indication of the UDR group identifier to one or more other network function devices based on receiving a request for the UDR group identifier. In some implementations, the AMF 118 and/or the SMF 110 may transmit an indication of the UDR group identifier to one or more other network function devices based on determining the UDR group identifier.

At 148-1 the AMF 118 may transmit the indication of the UDR group identifier to the AM-PCF 116 (e.g., via an Npcf 5G network function interface), to the UE-PCF 114 (e.g., via an Npcf 5G network function interface), and/or to another network function device included in the core network 106.

At 148-2 the SMF 110 may transmit the indication of the UDR group identifier to the SM-PCF 112 (e.g., via an Npcf 5G network function interface), to the UDM 122 (e.g., via an Nudm 5G network function interface), to the NEF 130 (e.g., via an Nnef 5G network function interface), and/or to another network function device included in the core network 106.

At 148-3, other network function devices in the core network 106 may additionally propagate the indication of the UDR group identifier to one or more other network function devices in the core network 106. For example, the NEF 130 may transmit the indication of the UDR group identifier to the SM-PCF 112 (e.g., via an Npcf 5G network function interface). As another example, the UDM 122 may transmit the indication of the UDR group identifier to the SM-PCF 112 (e.g., via an Npcf 5G network function interface). As another example, the SM-PCF 112 may transmit the indication of the UDR group identifier to the NEF 130 (e.g., via an Nnef 5G network function interface). As another example, the UDM 122 may transmit the indication of the UDR group identifier to the NEF 130 (e.g., via an Nnef 5G network function interface). As another example, the NEF 130 may transmit the indication of the UDR group identifier to the UDM 122 (e.g., via an Nudm 5G network function interface).

In this way, only the AUSF 120 performs the SUPI-based lookup with the NRF 126 during the session setup. The AMF 118 and the one or more other network function devices do not need the NRF 126 to repeat the SUPI-based lookup performed at 134-138. Instead, the AMF 118, the SMF 110, and/or one or more other network function devices can proceed directly to obtaining user data from the UDM 122 using the UDR 124 using the UDR group identifier. This reduces overhead signaling in the core network 106 that would otherwise result from repeated UDR and UDM discovery with the NRF 126. Moreover, this reduces latency in the session setup procedure. In addition, the optimized communications between the network function devices in the core network 106 reduce network TPS (which reduces consumption of processing, memory, and/or networking resources of network function devices in the core network 106).

Figure 1G:
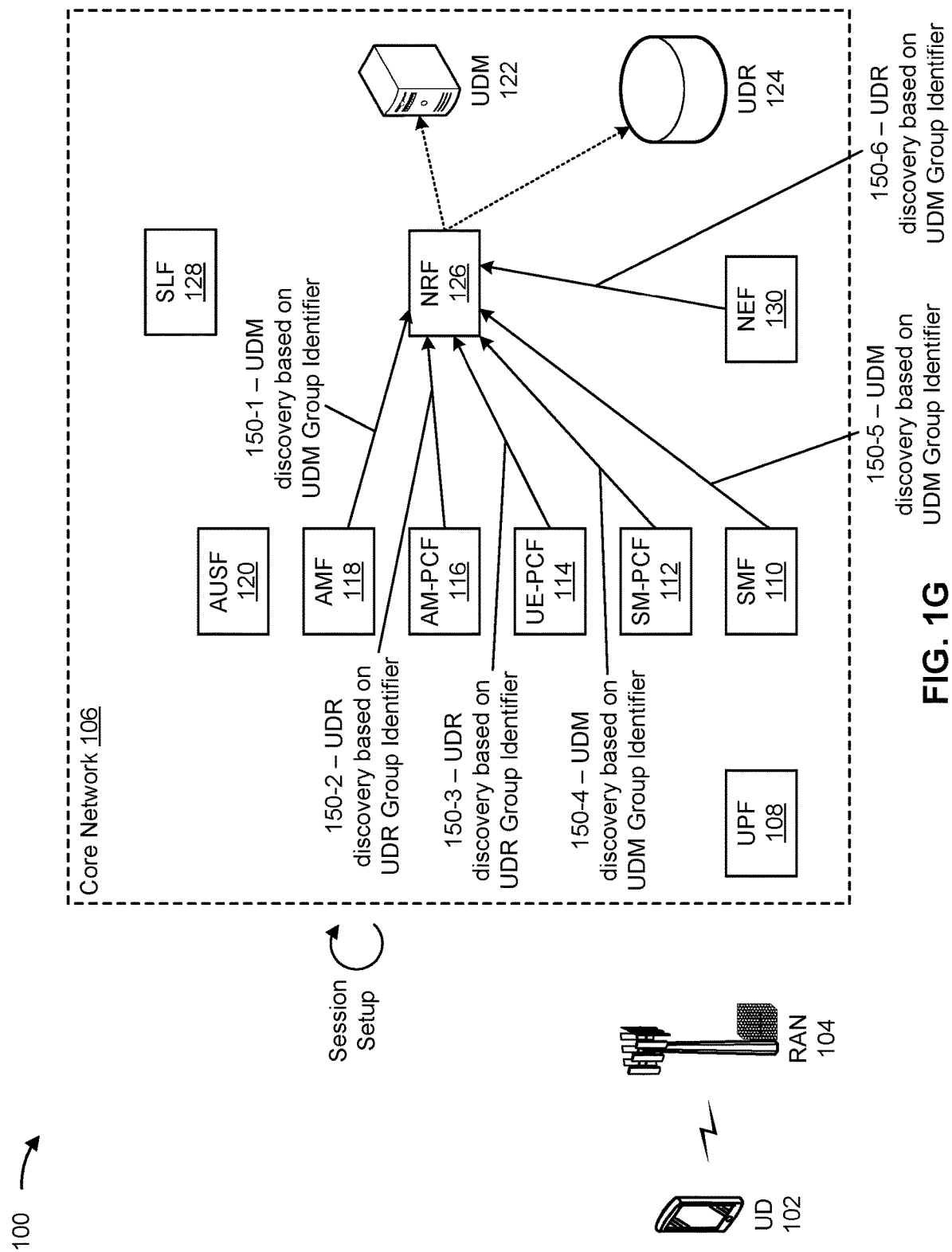

As shown in FIG. 1G, at 150-1 through 150-6, one or more of the network function devices in the core network 106 may perform UDM discovery and/or UDR discovery based on the UDM group identifier and/or the UDR group identifier. The one or more of the network function devices in the core network 106 may perform UDM discovery and/or UDR discovery to obtain user data associated with the user profile that is associated with the user device 102. The user data may include an indication of the services that the subscriber associated with the user profile is permitted to access at the UDM 122 and/or at the UDR 124; may include an indication of the service tier that the subscriber associated with the user profile is permitted to access at the UDM 122 and/or at the UDR 124; and/or may include other user data.

As an example, at 150-1, the AMF 118 may query the NRF 126 for UDM discovery, based on the UDM group identifier, to obtain user data from the UDM 122. As another example, at 150-2, the AM-PCF 116 may query the NRF 126 for UDR discovery, based on the UDR group identifier, to obtain user data from the UDR 124. As another example, at 150-3, the UE-PCF 114 may query the NRF 126 for UDR discovery, based on the UDR group identifier, to obtain user data from the UDR 124. As another example, at 150-4, the SM-PCF 112 may query the NRF 126 for UDR discovery, based on the UDR group identifier, to obtain user data from the UDR 124. As another example, at 150-5, the SMF 110 may query the NRF 126 for UDM discovery, based on the UDM group identifier, to obtain user data from the UDM 122. As another example, at 150-6, the NEF 130 may query the NRF 126 for UDR discovery, based on the UDR group identifier, to obtain user data from the UDR 124.

It is to be noted that, while the example 100 may include authentication of the user device 102 by the AUSF 120 using a SUCI, the techniques described in connection with FIGS. 1A-1G may also be implemented in other registration and/or session setup scenarios in the core network 106. For example, the techniques described in connection with FIGS. 1A-1G may also be implemented in a 5G global unique temporary identifier (5G-GUTI) registration procedure. Here, a session setup procedure is performed for a user device 102 that has previously registered with the core network 106 and is assigned a global unique temporary identifier (GUTI). Thus, the user device 102 is already authenticated through the AUSF 120, and the AUSF 120 can be omitted from the session setup procedure. The AMF 118 may generate and store the GUTI, along with a mapping of the GUTI to the SUPI, for subsequent registrations and/or session requests. In these implementations, the AMF 118 performs the operations described in connection with 134-138 instead of the AUSF 120.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2A:
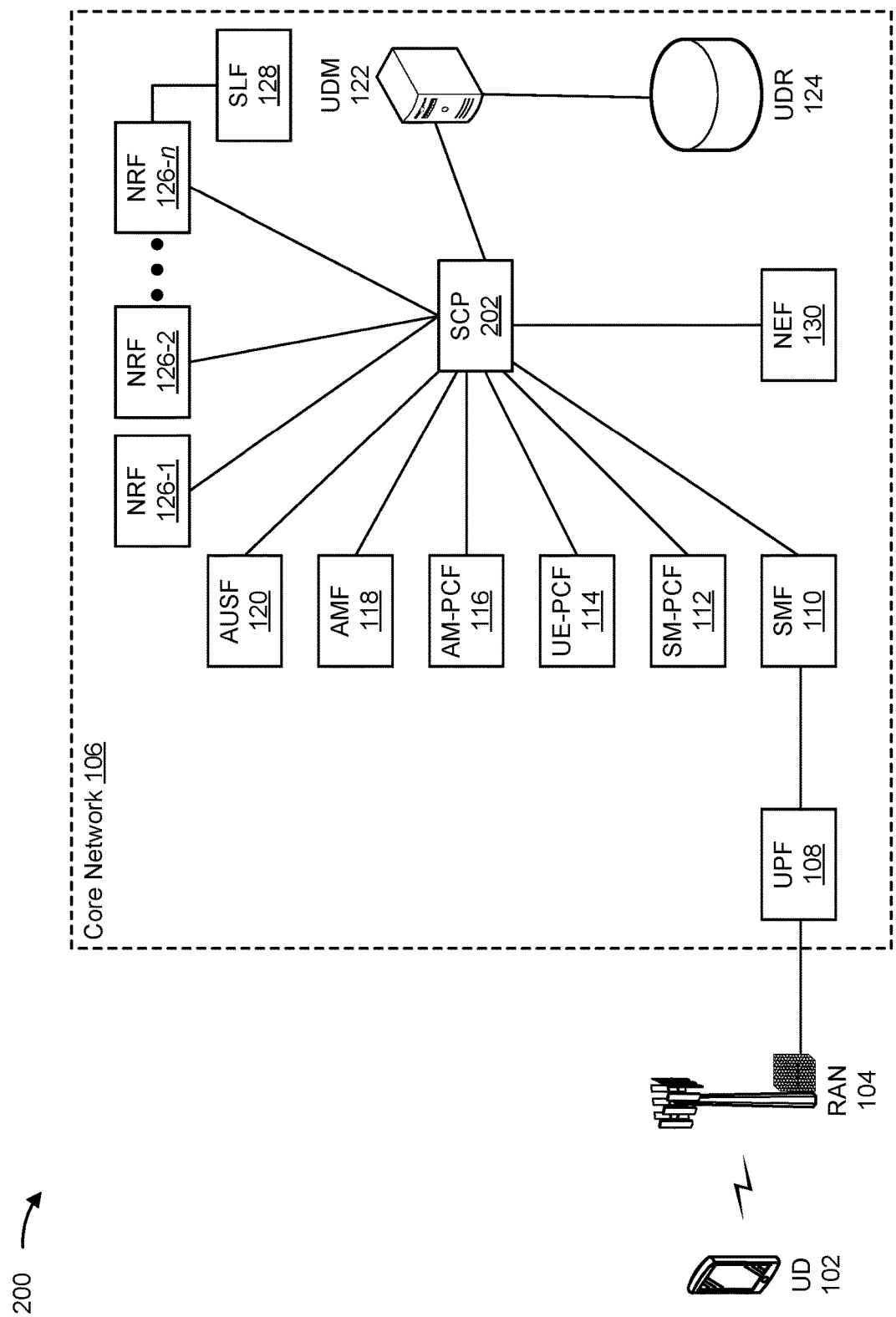
FIGS. 2A-2D are diagrams of an example associated with session setup in a core network.
Figure 2B:
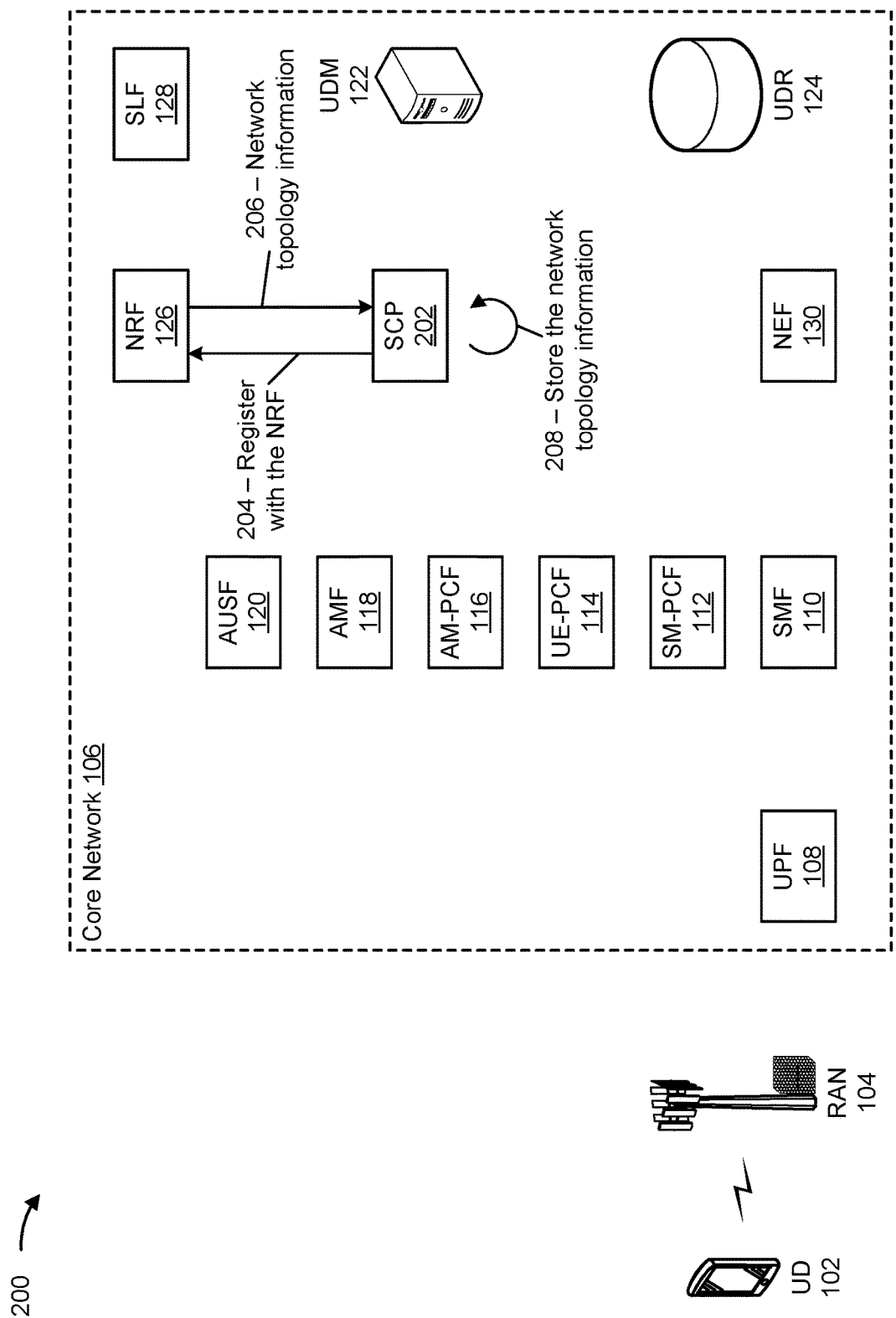
Figure 2C:
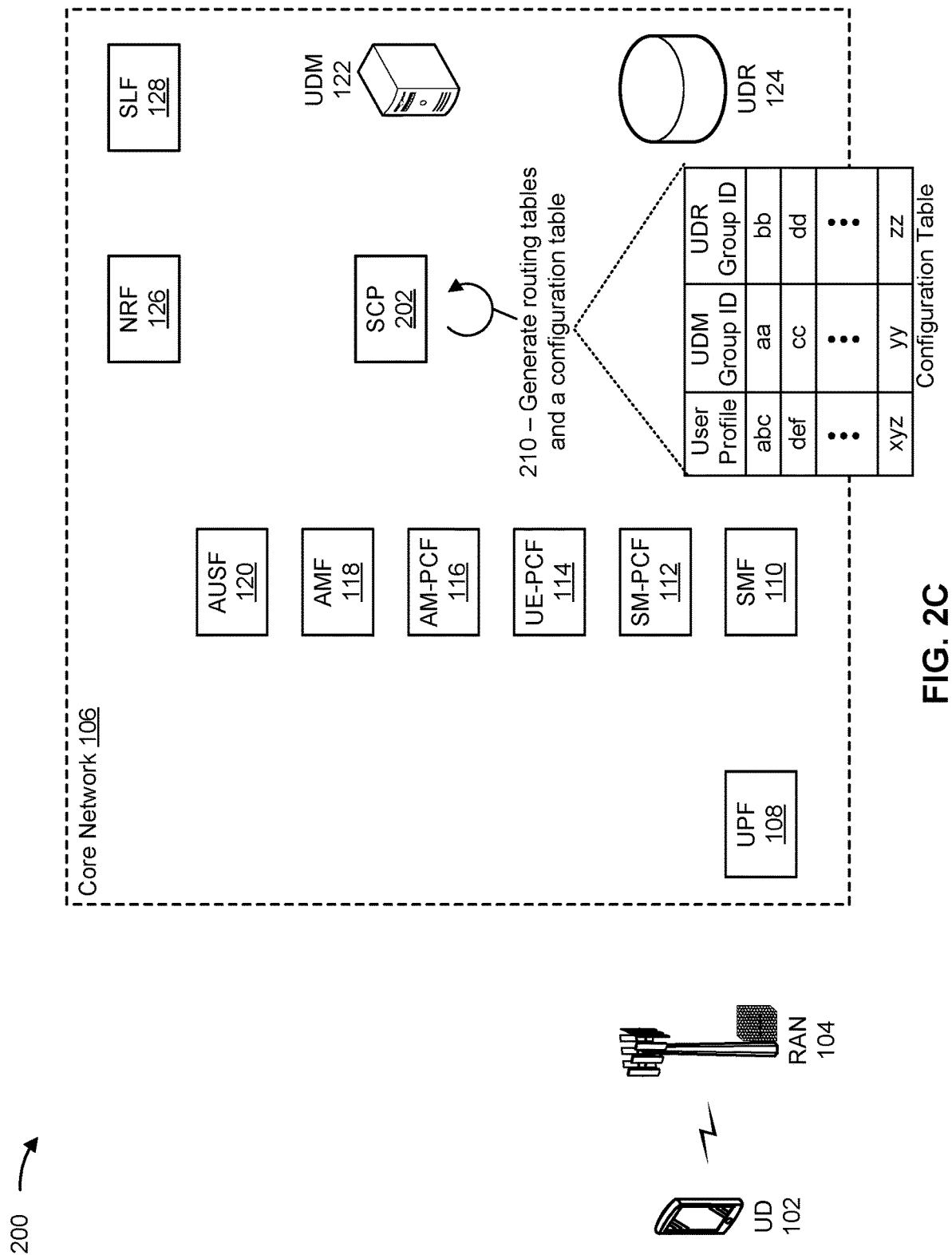

FIGS. 2A-2C are diagrams of an example 200 associated with session setup in a core network. As shown in FIGS. 2A, example 200 includes devices 102-130, which are similar to the devices 102-130 in the example 100 of FIGS. 1A-1G. However, in the example 200, the core network 106 includes a service communication proxy (SCP) network function device (referred to as the SCP 202). The SCP 202 communicates with a plurality of NRFs 126-1 through 126-*n* in the core network 106.

As further shown in FIG. 2A, the network function devices 110-130 may be communicatively connected with the SCP 202. In this network model, the SCP 202 functions as a centralized routing hub. The SCP 202 provides indirect communication between the network function devices 110-130 and provides delegated discovery for the network function devices 110-130. In other words, requests for discovery of other network function devices, that are typically provided directly to the NRF 126 by network function devices in the core network 106, are handled by the SCP 202. This enables load balancing in the core network 106 to be unified, enables real-time delivery of network function requests and responses, and/or enables optimized capacity in the core network 106, among other examples.

In some implementations, the operations described in connection with the example 200 may be performed prior to a session setup procedure for the user device 102, and prior to the operations described in connection with the example 100 of FIGS. 1A-1G. In some implementations, the operations described in connection with the example 200 may be performed during a session setup procedure.

As shown in FIG. 2B, at 204, the SCP 202 may register with an NRF 126 in the core network 106. The SCP 202 may provide an NFDiscover message to the NRF 126 and, at 206, may receive network topology information associated with the core network 106 from the NRF 126 based on the NFDiscover message. The network topology information may include identifiers assigned to the network functions included in the core network 106, the connections between the network functions, the 5G network function interfaces that the network functions use to communicate in the core network 106, user profiles of subscribes that are served by the core network 106, and/or other network topology information. At 208, the SCP 202 may store the network topology information in cache at the SCP 202.

As shown in FIG. 2C, at 210, the SCP 202 may generate routing tables for the network functions in the core network 106 based on the network topology information. Moreover, the SCP 202 may generate a configuration table for the core network 106. Generating the configuration table may include generating mappings between respective pairs of UDMs 122 and UDRs 124 included in the core network 106. The configuration table may include a plurality of rows that include mappings or associations between user profiles, UDM group identifiers, and UDR group identifiers. In particular, each row may include a mapping or association between a user profile of a subscriber that is served by the core network 106, a UDM group identifier that is associated with a UDM 122 to which the user profile is assigned, and a UDR group identifier that is associated with a UDR 124 to which the user profile is assigned. The SCP 202 may generate these mappings or associations based on the network topology information provided by the NRF 126 (and other NRFs 126 in the core network).

In some implementations, the mappings or associations in the configuration may be static in that the mappings or associations do not change over time. In some implementations, the mappings or associations in the configuration may be dynamic in that mappings or associations may be added to the configuration table, mappings or associations may be deleted form the configuration table, and/or mappings or associations may be modified based on mobility of a user device 102 associated with a user profile.

Figure 2D:
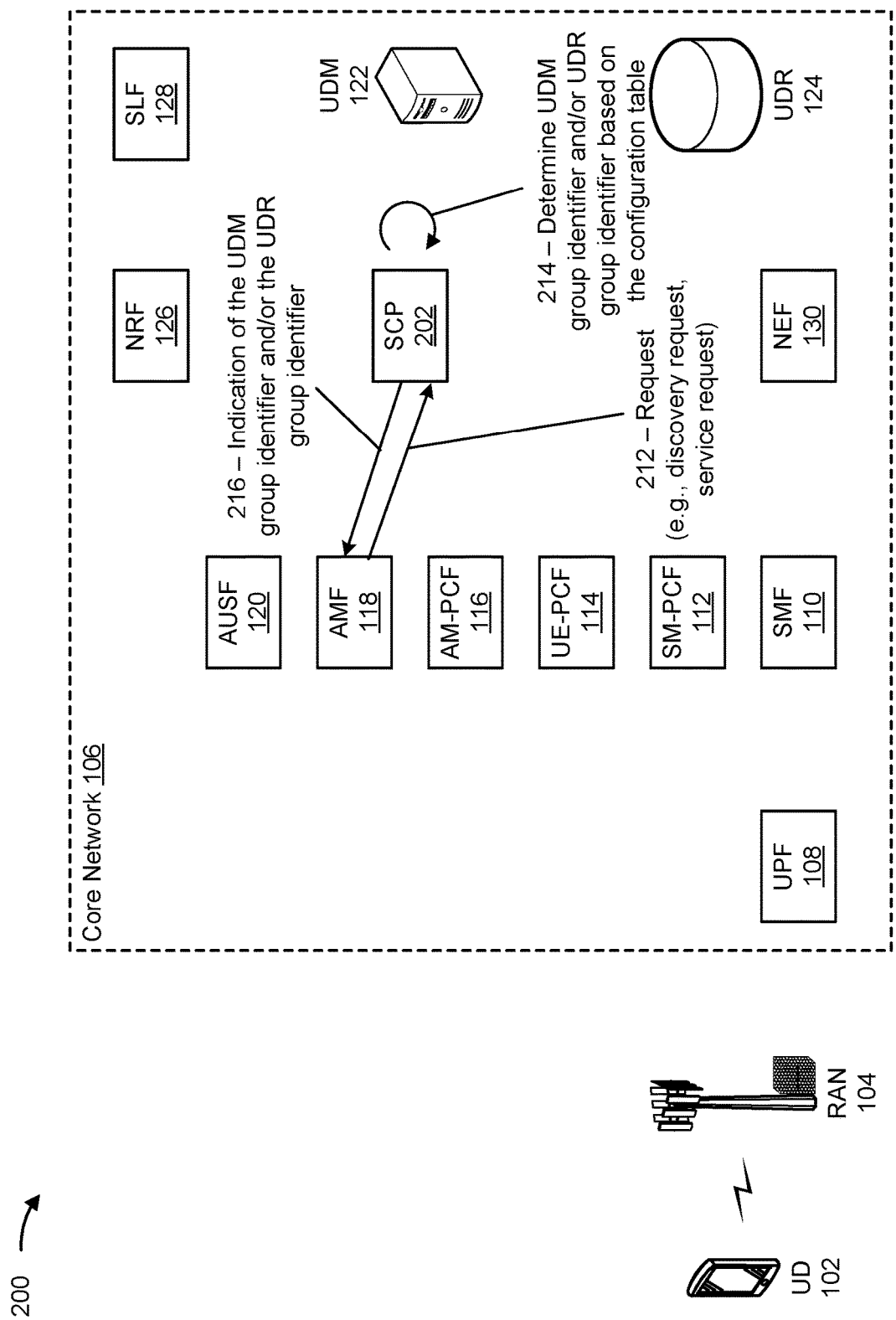

As shown in FIG. 2D, at 212, a network function device (e.g., the AMF 118 and/or another network function device) included in the core network 106 may transmit a request to the SCP 202. The request may include a discovery request (e.g., a request to discover a network function device and/or the services provided by the network function device), a service request (e.g., a request for a network function device to perform a service), and/or another type of request. In some implementations, the request is associated with a user profile that is associated with a user device. In some implementations, the request may include an indication of an identifier associated with the user profile (e.g., a SUCI, a GUTI, a SUPI, and/or another identifier). The SCP 202 may receive the request.

At 214, the SCP 202 may determine a UDM group identifier and/or a UDR group identifier based on the configuration table. The SCP 202 may determine a UDM group identifier and/or a UDR group identifier based on receiving the request. The request may indicate an identifier associated with a user profile that is associated with a user device 102. The SCP 202 may identify a row in the configuration table based on the identifier associated with the user profile. The SCP 202 may identify the UDM group identifier and/or the UDR group identifier based on a mapping or association between the user profile, the UDM group identifier, and the UDR group identifier indicated in the row. The UDM group identifier may be associated with a UDM 122 to which the user profile is assigned. The UDR group identifier may be associated with a UDR 124 to which the user profile is assigned.

Additionally and/or alternatively, the SCP 202 may transmit an indication of the configuration table to the AMF 118 and/or to the SMF 110, and the AMF 118 and/or the SMF 110 may determine the UDR group identifier based on the configuration, as described above in the example 100 of FIGS. 1A-1G.

At 216, the SCP 202 may transmit an indication of the UDM group identifier and/or the UDR group identifier to the AMF 118 and/or to another network function device associated with the request. In this way, the SCP 202 may satisfy the request, which reduces the quantity of lookups at the NRF 126/SLF 128. This may reduce TPS at the NRF 126/SLF 128 (which reduces consumption of processing, memory, and/or networking resources of the NRF 126/SLF 128) and/or may reduce latency associated with the request, among other examples.

As indicated above, FIGS. 2A-2D are provided as an example. Other examples may differ from what is described with regard to FIGS. 2A-2D. The number and arrangement of devices shown in FIGS. 2A-2D are provided as an example. In practice, there may be additional devices, fewer devices, different devices, or differently arranged devices than those shown in FIGS. 2A-2D. Furthermore, two or more devices shown in FIGS. 2A-2D may be implemented within a single device, or a single device shown in FIGS. 2A-2D may be implemented as multiple, distributed devices. Additionally, or alternatively, a set of devices (e.g., one or more devices) shown in FIGS. 2A-2D may perform one or more functions described as being performed by another set of devices shown in FIGS. 2A-2D.

Figure 3:
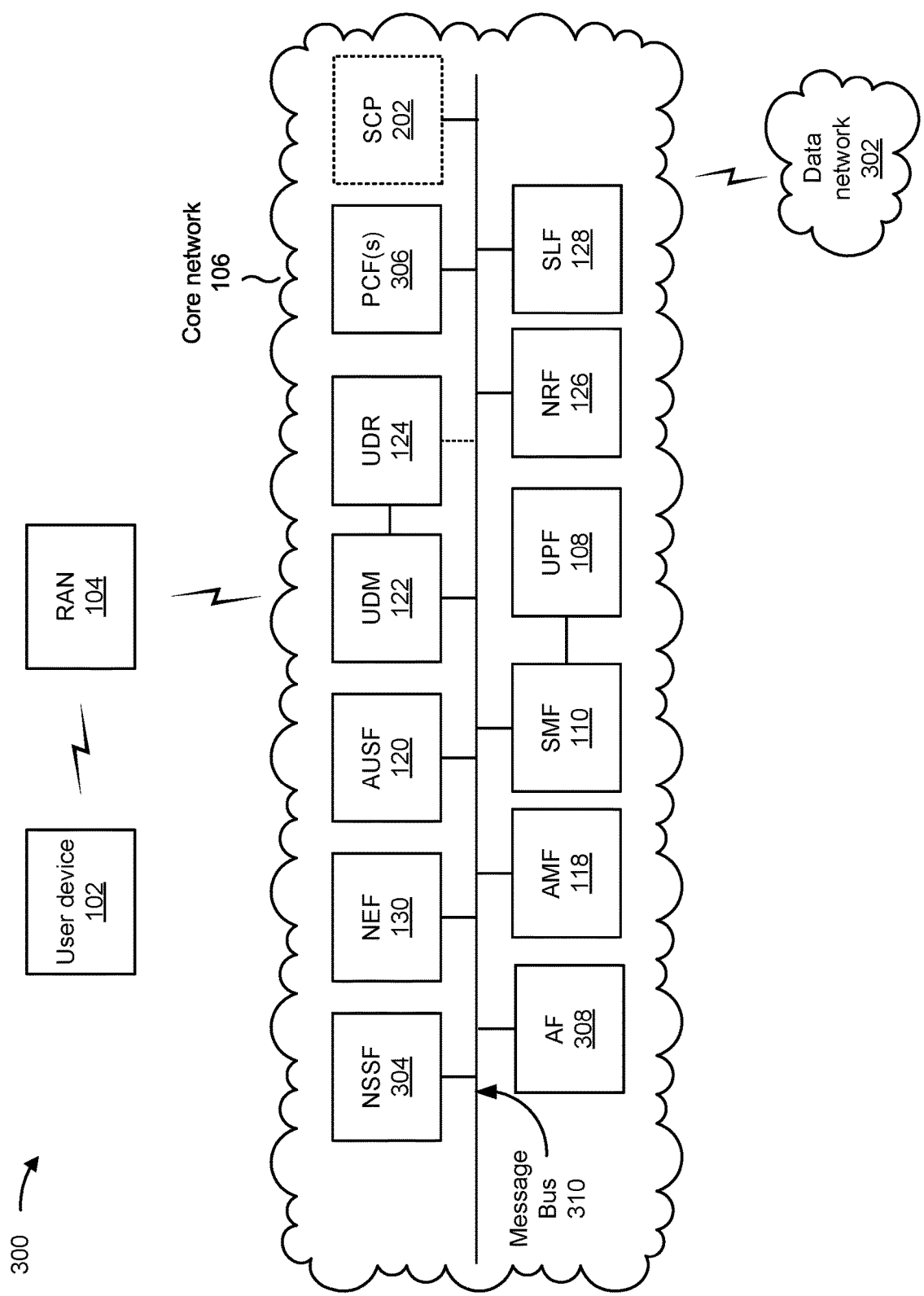
FIG. 3 is a diagram of an example environment in which systems and/or methods described herein may be implemented.

FIG. 3 is a diagram of an example environment 300 in which systems and/or methods described herein may be implemented. As shown in FIG. 3, example environment 300 may include a user device 102, a RAN 104, a core network 106, and a data network 302. Devices and/or networks of example environment 300 may interconnect via wired connections, wireless connections, or a combination of wired and wireless connections.

The user device 102 includes one or more devices capable of receiving, generating, storing, processing, and/or providing information, such as information described herein. For example, the user device 102 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device. The user device 102 may initiate a connection establishment procedure with the RAN 104, which may include transmitting a setup request described herein. The connection establishment procedure may include registration of the user device 102 with the RAN 104 and/or with the core network 106. The connection establishment procedure may include a PDU session setup procedure to establish a PDU session for which the user device 102 may access the data network 302 via the RAN 104 and the core network 106.

The RAN 104 may support, for example, a cellular radio access technology (RAT). The RAN 104 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for user device 102. The RAN 104 may transfer traffic between the user device 102 (e.g., using a cellular RAT), one or more base stations (e.g., using a wireless interface or a backhaul interface, such as a wired backhaul interface), and/or the core network 106. The RAN 104 may provide one or more cells that cover geographic areas.

In some implementations, the RAN 104 may perform scheduling and/or resource management for the user device 102 covered by the RAN 104 (e.g., the user device 102 covered by a cell provided by the RAN 104). In some implementations, the RAN 104 may be controlled or coordinated by a network controller, which may perform load balancing, network-level configuration, and/or other operations. The network controller may communicate with the RAN 104 via a wireless or wireline backhaul. In some implementations, the RAN 104 may include a network controller, a self-organizing network (SON) module or component, or a similar module or component. In other words, the RAN 104 may perform network control, scheduling, and/or network management functions (e.g., for uplink, downlink, and/or sidelink communications of the user device 102 covered by the RAN 104).

In some implementations, the core network 106 may include an example functional architecture in which systems and/or methods described herein may be implemented. For example, the core network 106 may include an example architecture of a fifth generation (5G) next generation (NG) core network included in a 5G wireless telecommunications system. While the example architecture of the core network 106 shown in FIG. 3 may be an example of a service-based architecture, in some implementations, the core network 106 may be implemented as a reference-point architecture and/or a 4G core network, among other examples.

As shown in FIG. 3, the core network 106 may include a number of functional elements. The functional elements may include, for example, a UPF 108 (e.g., a UPF network function device), an SMF 110 (e.g., an SMF network function device), an AMF 118 (e.g., an AMF network function device), an AUSF 120 (e.g., an AUSF 120 network function device), a UDM 122 (e.g., a UDM network function device), a UDR 124 (e.g., a UDR network function device), an NRF 126 (e.g., an NRF network function device), an SLF 128 (e.g., an SLF network function device), a network slice selection function (NSSF) 304 (e.g., an NSSF network function device), an NEF 130 (e.g., an NEF network function device), an SCP 202 (e.g., an SCP network function device), one or more policy control functions (PCFs) 306 (e.g., one or more PCF network function devices), and/or an application function (AF) 308 (e.g., an AF network function device), among other examples. These functional elements may be communicatively connected via a message bus 310. Each of the functional elements shown in FIG. 3 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment. In some implementations, one or more of the functional elements may be implemented by one or more devices, such as one or more devices 400 illustrated and described in connection with FIG. 4.

The UPF 108 includes one or more devices that serve as an anchor point for intraRAT and/or interRAT mobility. The UPF 108 may apply rules to packets, such as rules pertaining to packet routing, traffic reporting, and/or handling user plane QoS, among other examples.

The SMF 110 includes one or more devices that support the establishment, modification, and release of communication sessions in the wireless telecommunications system. For example, the SMF 110 may configure traffic steering policies at the UPF 108 and/or may enforce user equipment IP address allocation and policies, among other examples.

The AMF 118 includes one or more devices that act as a termination point for non-access stratum (NAS) signaling and/or mobility management, among other examples.

The AUSF 120 includes one or more devices that act as an authentication server and support the process of authenticating the user device 102 in the wireless telecommunications system.

The UDM 122 includes one or more devices that maintain (e.g., update, store, provide) user data and profiles in the wireless telecommunications system. The UDM 122 may be used for fixed access and/or mobile access in the core network 106. The user data and profiles may be stored in the UDR 124, which includes a data repository for storing the user data and profiles.

The NRF 126 includes one or more devices that provide a single record of all network functions available in the core network 106, together with a profile of each network function and services supported by each network function. The NRF 126 may allow other network functions to subscribe to, and get notified about, registration in the NRF 126 of new network function instances. In addition to maintaining profiles, the NRF 126 also supports service discovery functions, enabling other network functions to obtain information regarding available network functions that can support specific services.

The SLF 128 includes one or more devices that store, maintain, and/or provide subscription information associated with a plurality of user profiles, such as a user profile associated with a user device 102. The subscription information may include an indication of a home subscriber slice (HSS) associated with a user profile, an indication of a UDM 122 and/or a UDR 124 to which the user profile is assigned, a UDM profile associated with the user profile, a subscriber profile associated with the user profile, and/or other subscriber information associated with the user profile.

The SCP 202 includes one or more devices that provide routing of requests and responses between network function devices in the core network 106. The SCP 202 may register with the NRF(s) 126 in the core network 106. The SCP 202 may discover (e.g., using an NFDiscover message) the topology of the core network 106 from the NRF(s) 126 and store the topology in cache at the SCP 202. The SCP 202 may create routing rules for network functions in the core network 106. The SCP 202 may subscribe to the NRF(s) 126 in the core network 106 (e.g., using a NFStatusSubscribe message) to receive network function change notifications. The SCP 202 may periodically audit the NRF(s) 126 for network function status changes. The SCP 202 may update the cache of the SCP 202 with network function information changes.

The data network 302 includes one or more wired and/or wireless data networks. For example, the data network 302 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The NSSF 304 includes one or more devices that select network slice instances for the user device 102. By providing network slicing, the NSSF 304 allows an operator to deploy multiple substantially independent end-to-end networks potentially with the same infrastructure. In some implementations, each slice may be customized for different services.

The NEF 130 includes one or more devices that support exposure of capabilities and/or events in the wireless telecommunications system to help other entities in the wireless telecommunications system discover network services.

The PCF(s) 306 includes one or more devices that provide a policy framework that incorporates network slicing, roaming, packet processing, and/or mobility management, among other examples. The PCF(s) 306 may include an SM-PCF 112 (e.g., an SM-PCF network function device), a UE-PCF 114 (e.g., a UE-PCF network function device), and/or an AM-PCF 116 (e.g., an AM-PCF network function device), among other examples. The SM-PCF 112 may include one or more devices that provide a policy framework and maintain rules and policies for session management. The UE-PCF 114 may include one or more devices that provide a policy framework and maintain rules and policies for user devices 102. The AM-PCF 116 may include one or more devices that provide a policy framework and maintain rules and policies for access management.

The AF 308 includes one or more devices that support application influence on traffic routing, access to the NEF 130, and/or policy control, among other examples.

The message bus 310 represents a communication structure for communication among the functional elements. In other words, the message bus 310 may permit communication between two or more functional elements. The network function devices included in the core network 106 may communicate on the message bus 310 using one or more of the 5G network function interfaces described above.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of example environment 300 may perform one or more functions described as being performed by another set of devices of example environment 300.

Figure 4:
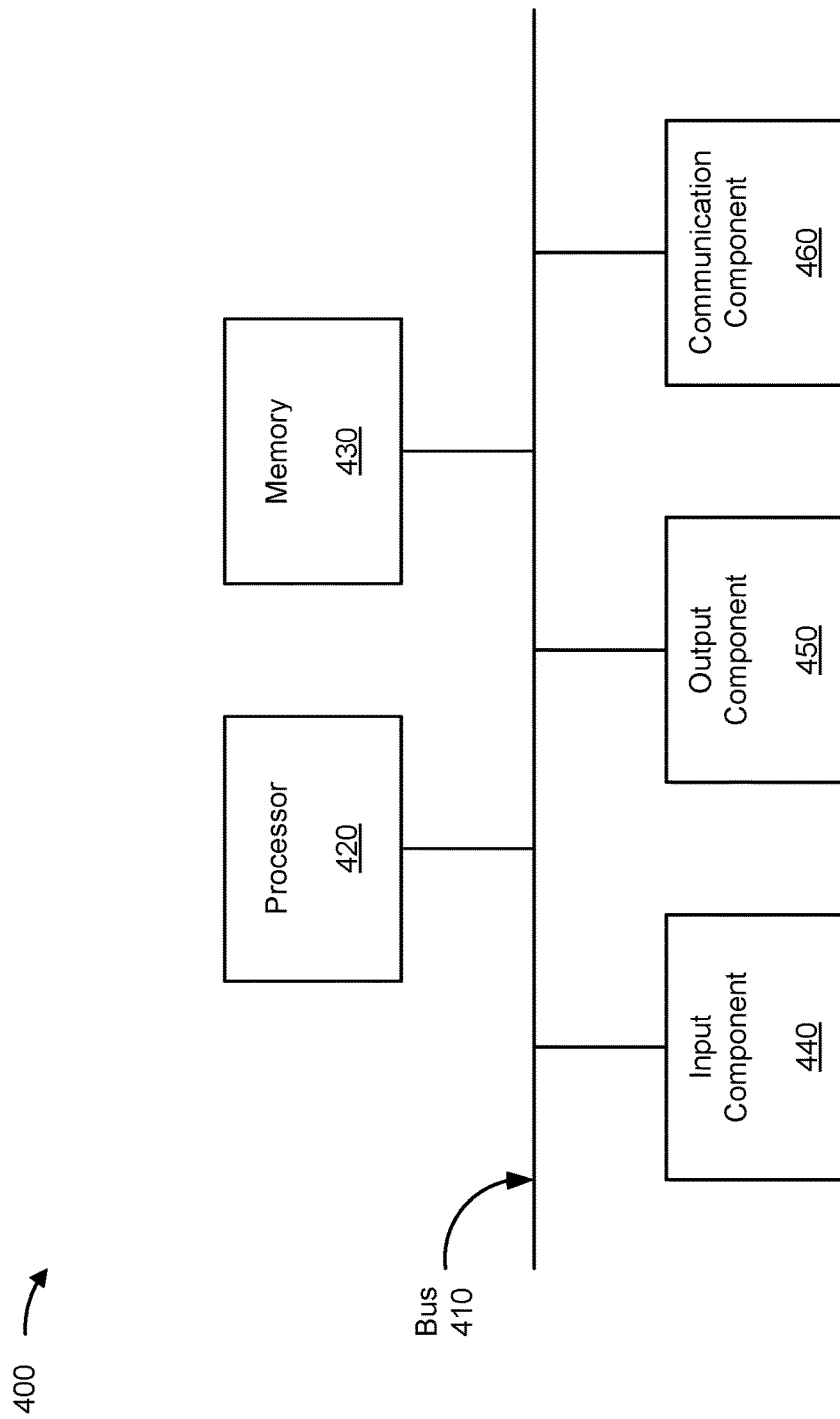
FIG. 4 is a diagram of example components of a device associated with session setup in a core network.

FIG. 4 is a diagram of example components of a device 400 associated with session setup in a core network. The device 400 may correspond to the user device 102, one or more components of the RAN 104, one or more components of the core network 106, the UPF 108, the SMF 110, the SM-PCF 112, the UE-PCF 114, the AM-PCF 116, the AMF 118, the AUSF 120, the UDM 122, the UDR 124, the NRF 126, the SLF 128, the NEF 130, the SCP 202, the NSSF 304, the PCF(s) 306, the AF 308, and/or one or more components in the data network 302. In some implementations, the user device 102, one or more components of the RAN 104, one or more components of the core network 106, the UPF 108, the SMF 110, the SM-PCF 112, the UE-PCF 114, the AM-PCF 116, the AMF 118, the AUSF 120, the UDM 122, the UDR 124, the NRF 126, the SLF 128, the NEF 130, the SCP 202, the NSSF 304, the PCF(s) 306, the AF 308, and/or one or more components in the data network 302 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
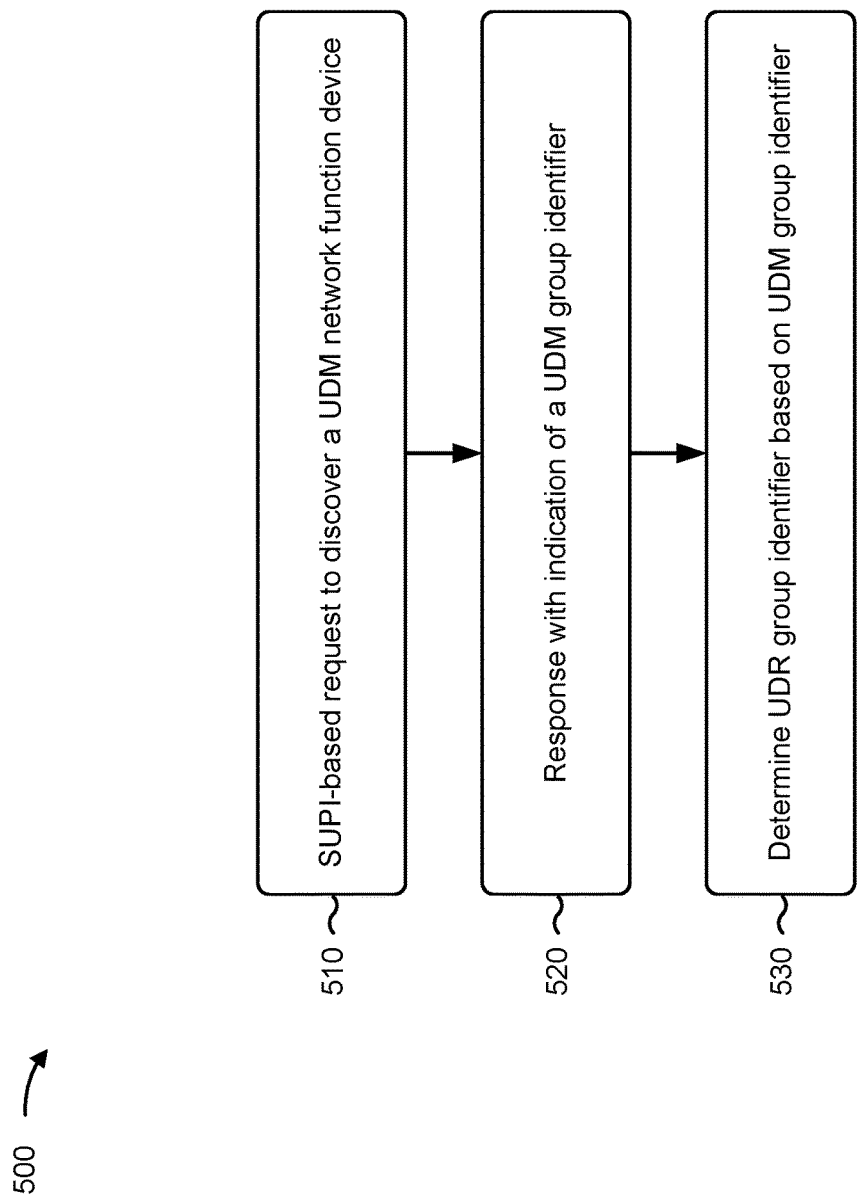
FIG. 5 is a flowchart of an example process associated with session setup in a core network.

FIG. 5 is a flowchart of an example process 500 associated with session setup in a core network. In some implementations, one or more process blocks of FIG. 5 may be performed by a first network function device (e.g., the UPF 108, the SMF 110, the SM-PCF 112, the UE-PCF 114, the AM-PCF 116, the AMF 118, the AUSF 120, the UDM 122, the UDR 124, the NRF 126, the SLF 128, the NEF 130, the SCP 202, the NSSF 304, a PCF 306, and/or the AF 308). In some implementations, one or more process blocks of FIG. 5 may be performed by another device or a group of devices separate from or including the first network function device, such as the user device 102, one or more components of the RAN 104, and/or one or more components of the data network 302, among other examples. Additionally, or alternatively, one or more process blocks of FIG. 5 may be performed by one or more components of device 400, such as processor 420, memory 430, input component 440, output component 450, and/or communication component 460.

As shown in FIG. 5, process 500 may include a SUPI-based request to discover a UDM network function device (block 510). For example, the first network function device may transmit a SUPI-based request to discover a UDM network function device, as described herein. The UDM network function device may be associated with a SUPI of a user profile that is assigned to a user device. In some implementations, the first network function may transmit the SUPI-based request to an NRF network function device in a core network, and the NRF network function device may receive the SUPI-based request. In some implementations, the first network function may transmit the SUPI-based request to an SCP network function device in a core network, and the SCP network function device may receive the SUPI-based request. In some implementations, the first network function may transmit (and the NRF network function device and/or the SCP network function device may receive) an indication of the SUPI associated with a user profile that is associated with the user device. The user profile may be assigned to the UDM network function device.

As further shown in FIG. 5, process 500 may include a response with an indication of a UDM group identifier (block 520). For example, the first network function device may receive, based on the SUPI-based request, an indication of a UDM group identifier associated with the UDM network function device, as described herein. The NRF network function device and/or the SCP network function device may transmit, to the first network function device, the indication of the UDM group identifier based on the SUPI-based request. The first network function device may transmit, to one or more second network function devices included in the core network, the indication of the UDM group identifier. For example, the first network function device may include an AUSF network function device that transmits the indication of the UDM group identifier to an AMF network function device in the core network and/or to an SMF network function device included in the core network.

To identify the UDM group identifier and the UDR group identifier, the NRF network function device may transmit, to an SLF network function device, a request for the UDM group identifier and the UDR group identifier. The request may include an indication of the SUPI associated with the user profile of the user device. The SLF network function may look up the UDM group identifier and the UDR group identifier using the SUPI and may provide an indication of the UDM group identifier and the UDR group identifier to the NRF network function device. The NRF may receive the UDM group identifier and the UDR group identifier and may provide an indication of the UDM group identifier and the UDR group identifier to the first network function device.

As further shown in FIG. 5, process 500 may include determining a UDR group identifier based on the UDM group identifier (block 530). For example, the AMF network function device and/or the SMF network function device may determine the UDR group identifier based on the UDM group identifier using a configuration table. In particular, the AMF network function device and/or the SMF network function device may identify a row in the configuration table based on the UDM group identifier, where the row is associated with user profile. The AMF network function device and/or the SMF network function device may determine the UDR group identifier based on a mapping or association between the UDM group identifier and the UDR group identifier indicated in the row.

In some implementations, the process 500 may include session setup based on the UDM group identifier and/or the UDR group identifier. For example, the first network function device may transmit, to the NRF network function device, at least one of a request for discovery of the UDM network function device based on the UDM group identifier or a request for discovery of the UDR network function device based on the UDR group identifier, as described herein. As another example, the one or more second network function devices may transmit, to the NRF network function device, at least one of a request for discovery of the UDM network function device based on the UDM group identifier or a request for discovery of the UDR network function device based on the UDR group identifier, as described herein. The NRF network function device may receive the request(s), may obtain user data (e.g., associated with the user profile of the user device) from the UDM network function device and/or the UDR network function device, and may provide the user data to the first network device and/or to the one or more second network function devices.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, from an authentication server function (AUSF) network function device and by a session management function (SMF) network function device included in a core network, a user data management (UDM) group identifier that is associated with a UDM network function device included in the core network;
   determining, by the SMF network function device, based on the UDM group identifier, and using a configuration table stored by the SMF network function device, a user data repository (UDR) group identifier associated with a UDR network function device that is associated with the UDM network function device; and
   transmitting, by the SMF network function device, and to one or more second network function devices included in the core network, the UDR group identifier, wherein the one or more second network function devices include at least one of:
      a policy control function (PCF) network function device,
      the UDM network function device, or
      a network exposure function (NEF) network function device.

2. The method of claim 1,
   wherein determining the UDR group identifier using the configuration table comprises:
      determining the UDR group identifier based on an association, between the UDM group identifier and the UDR group identifier, indicated in the configuration table.

3. The method of claim 1,
   wherein transmitting the UDR group identifier to the one or more second network function devices comprises:
      transmitting the UDR group identifier to at least one of:
         an access and mobility management policy control function (AM-PCF) network function device,
         a user equipment policy control function (UE-PCF) network function device, or
         a session management policy control function (SM-PCF) network function device.

4. The method of claim 1,
   wherein receiving the UDM group identifier comprises:
      receiving the UDM group identifier by an access and mobility management function (AMF) network function device included in the core network; and
   wherein the method further comprises:
      transmitting, by the AMF network function device and to the SMF network function device, the UDM group identifier.

5. A service communication proxy (SCP) network function device, comprising:
   one or more processors configured to:
      receive, from a network repository function (NRF) network function device included in a core network, network topology information associated with the core network, wherein the network topology information includes user profiles of subscribers that are served by the core network;
      generate, based on the network topology information, a mapping between a user profile of a subscriber, a user data management (UDM) group identifier, and a user data repository (UDR) group identifier,
         wherein the UDM group identifier is associated with a UDM network function device to which the user profile is assigned,
         wherein the UDR group identifier is associated with a UDR network function device to which the user profile is assigned, and
         wherein the UDR network function device is associated with the UDM network function device;
      receive a discovery request from an access and mobility management function (AMF) network function device included in the core network; and
      transmit, to the AMF network function device and based on the discovery request, the mapping between the user profile of the subscriber, the UDM group identifier and the UDR group identifier.

6. The SCP network function device of claim 5,
   wherein the one or more processors are further configured to:
      store, in a configuration table, the mapping between the user profile of the subscriber, the UDM group identifier and the UDR group identifier.

7. The SCP network function of claim 6,
   wherein the one or more processors, to transmit the mapping between the user profile of the subscriber, the UDM group identifier and the UDR group identifier, are configured to:
      transmit the configuration table to the AMF network function device or to a session management function (SMF) network function device included in the core network.

8. The SCP network function of claim 5,
   wherein the one or more processors are further configured to:
      store, in a configuration table, the mapping between the user profile of the subscriber, the UDM group identifier, and the UDR group identifier.

9. The SCP network function of claim 8,
   wherein the one or more processors are further configured to:
      identify, based on receiving the discovery request, the mapping between the user profile of the subscriber, the UDM group identifier, and the UDR group identifier indicated in the configuration table.

10. The SCP network function of claim 5,
    wherein the one or more processors, to transmit the mapping between the user profile of the subscriber, the UDM group identifier and the UDR group identifier, are further configured to:
       transmit the mapping between the user profile of the subscriber, the UDM group identifier and the UDR group identifier to at least one of:

an authentication server function (AUSF) network function device, or a session management function (SMF) network function device.

11. The SCP network function of claim 5, wherein the one or more processors, to receive the network topology information, are configured to:

receive the network topology information from a plurality of NRF network function devices included in the core network; and wherein the one or more processors, to generate the mapping between the user profile of the subscriber, the UDM group identifier and the UDR group identifier, are configured to:

generate mappings between respective pairs of UDM network function devices and UDR network function devices included in the core network.

12. The method of claim 1, wherein the configuration table includes:

a plurality of rows corresponding to a plurality of user profiles associated with the core network, and wherein each row, of the plurality of rows, indicates a mapping between a corresponding UDM group identifier and a corresponding UDR group identifier.

13. The method of claim 1, wherein receiving the UDM group identifier is based on a setup request from a user device, and wherein the UDM network function device is associated with a user profile of the user device.

14. The method of claim 1, wherein the SMF network function device maintains the configuration table.

15. The method of claim 1, wherein receiving the UDM group identifier is based on a setup request from a user device, and wherein the setup request indicates a subscription concealed identifier (SUCI) associated with a user profile associated with the user device.

16. A session management function (SMF) network function device included in a core network, comprising:

one or more processors configured to:

receive, from an authentication server function (AUSF) network function device, a user data management (UDM) group identifier that is associated with a UDM network function device included in the core network;

determine, based on the UDM group identifier, and using a configuration table stored by the SMF network function device, a user data repository (UDR) group identifier associated with a UDR network function device that is associated with the UDM network function device; and transmit the UDR group identifier to one or more second network function devices included in the core network, wherein the one or more second network function devices include at least one of:

a policy control function (PCF) network function device, the UDM network function device, or a network exposure function (NEF) network function device.

17. The SMF network function device of claim 16, wherein the one or more processors, to determine the UDR group identifier using the configuration table, are configured to:

determine the UDR group identifier based on an association, between the UDM group identifier and the UDR group identifier, indicated in the configuration table.

18. The SMF network function device of claim 16, wherein the one or more processors, to transmit the UDR group identifier to the one or more second network function devices, are configured to:

transmit the UDR group identifier to at least one of:

an access and mobility management policy control function (AM-PCF) network function device, a user equipment policy control function (UE-PCF) network function device, or a session management policy control function (SM-PCF) network function device.

19. The SMF network function device of claim 16, wherein receiving the UDM group identifier is based on a setup request from a user device, and wherein the UDM network function device is associated with a user profile of the user device.

20. The SMF network function device of claim 16, wherein the configuration table includes:

a plurality of rows corresponding to a plurality of user profiles associated with the core network, and wherein each row, of the plurality of rows, indicates a mapping between a corresponding UDM group identifier and a corresponding UDR group identifier.

* * * * *